Patented Jan. 16, 1951

2,537,975

UNITED STATES PATENT OFFICE 2,537,975

1-FLUOROALKYLAMINO-4-ARYLAMINO-ANTHRAQUINONE COMPOUNDS

Joseph B. Dickey, Rochester, N. Y., assignor to Eastman Kodak Company, Rochester, N. Y., a corporation of New Jersey No Drawing. Application January 31, 1948, Serial No. 5,677

8 Claims. (Cl. 260—380)

This invention relates to new anthraquinone compounds and their application to the art of dyeing or coloring. By means of my new dye compounds textile materials made of or containing a cellulose alkyl carboxylic acid ester having two to four carbon atoms in the acid groups thereof are colored blue shades having excellent fastness properties.

By cellulose alkyl carboxylic acid esters having two to four carbon atoms in the acid groups thereof I mean to include both hydrolyzed and unhydrolyzed cellulose acetate, cellulose propionate, cellulose butyrate, cellulose acetate-propionate, and cellulose acetate-butyrate.

It is an object of my invention to provide new anthraquinone compounds. Another object is to provide blue colorations on the aforesaid textile materials which possess excellent fastness to light and good fastness to gas. A specific object is to provide blue colorations on cellulose acetate textile materials possessing excellent fastness properties. A further object is to provide a satisfactory process for preparing the new anthraquinone compounds of my invention.

The anthraquinone compounds by means of which the foregoing objects are accomplished or made possible have the formula:

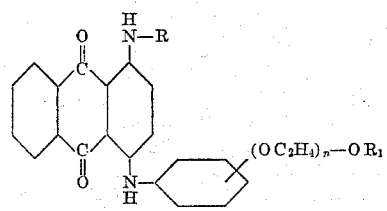

wherein R represents a $\beta,\beta$-difluoroethyl group or a $\beta,\beta,\beta$-trifluoroethyl group, $R_1$ represents a hydrogen atom, a methyl group, or an ethyl group, and $n$ represents a whole integer of from two to three, inclusive.

The anthraquinone compounds of my invention can be prepared by several different procedures. For example, a compound having the formula:

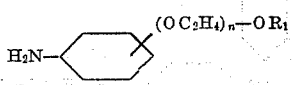

wherein $R_1$ and $n$ have their previously specified meanings when heated with a compound having the formula:

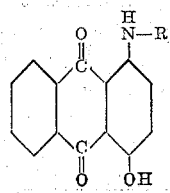

wherein R has its previously assigned meaning in the presence of boric acid at a temperature of about 190° C. yields one of the new compounds of my invention. If desired the leuco derivative of the compound just illustrated can be reacted directly with the aniline compound shown above in n-amyl alcohol. The product is then oxidized to its non-leuco form and recovered.

Alternatively the aniline compound referred to in the preceding paragraph can be reacted with a compound having the formula:

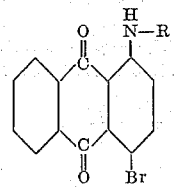

wherein R has its previously specified meaning in an aqueous mixture containing cupric acetate, acetic acid, and 28% ammonia water to yield one of the dye compounds of my invention.

Another method, and the one I prefer to use, is to reflux a compound having the formula:

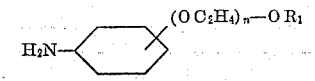

wherein $R_1$ and $n$ have the meanings previously assigned to them with 1-$\beta,\beta$-difluoroethylamino-4-bromoanthraquinone or 1-$\beta,\beta,\beta$-trifluoroethylamino-4-bromoanthraquinone in n-amyl alcohol as a solvent and in the presence of potassium acetate as an acid binding agent and finely powdered cupric sulfate as a catalyst. Ordinarily a small molar excess of the aniline compound is employed. Upon completion of the reaction the dye compound formed is recovered in accordance with either of the two methods described in Example 1. By this method good yields of high purity are obtained.

The following examples illustrate the compounds of my invention and their manner of preparation:

EXAMPLE 1

36.6 grams of 1-$\beta,\beta$-difluoroethylamino-4-bromoanthraquinone, 30.6 grams of o-aminophenyl-$\beta$-hydroxy-$\beta$-ethoxy-$\beta$-ethoxyethyl ether, 12 grams of potassium acetate and 1.2 grams of finely powdered cupric sulfate (CuSO$_4$.5H$_2$O) are heated under reflux with stirring in 200 cc. of n-amyl alcohol. Heating is continued for seven hours or until a series of small samples of one drop each removed periodically and dissolved in acetone show no further color change. The reaction product is isolated and purified by either of the following methods:

Method I

The reaction mixture is evaporated to dryness in vacuo on a steam bath and 300 cc. of toluene are added to the residue. The resulting mixture is heated to boiling, filtered hot, and the insoluble material washed with 60 cc. of boiling toluene. To the filtrate, cooled to 15° C., are added 90 grams of petroleum ether during five minutes with good stirring and further cooling to 0°–5° C. After about one hour the dye is solid and is recovered by filtration, washed with 60 cc. of petroleum ether, and dried at 40°–50° C.

Method II

The reaction mixture is filtered hot to remove most of the salts, and the filtrate is allowed to cool slowly overnight following which it is filtered. The solid material collected is washed with 75 cc. of petroleum ether and dried at 40°–50° C. The filtrate obtained is treated just as the reaction mixture in Method I using half the volume of solvents.

By employing either Method I or Method II for the recovery of the dye compound a good yield of 1 - $\beta,\beta$ - difluoroethylamino-4 - (o-$\beta$-hydroxy - $\beta$ - ethoxy - $\beta$ - ethoxyethoxyphenyl) aminoanthraquinone having the formula:

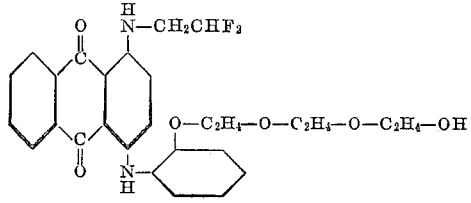

is obtained. It colors cellulose acetate blue shades.

EXAMPLE 2

36.6 grams of 1 - $\beta,\beta$ - difluoroethylamino-4-bromoanthraquinone, 30.6 grams of p-aminophenyl-$\beta$-hydroxy - $\beta$ - ethoxy - $\beta$ - ethoxyethyl ether, 12 grams of potassium acetate, and 1.2 grams of finely powdered cupric sulfate are added to 200 cc. of n-amyl alcohol and the resulting mixture is stirred while heating under reflux for about seven hours. The dye product formed is isolated and purified by following the procedure described under Example 1 entitled Method I. The 1-$\beta,\beta$-difluoroethylamino-4-(p-$\beta$ - hydroxy-$\beta$-ethoxy - $\beta$ - ethoxyethoxyphenyl) aminoanthraquinone thus obtained in good yield has the formula:

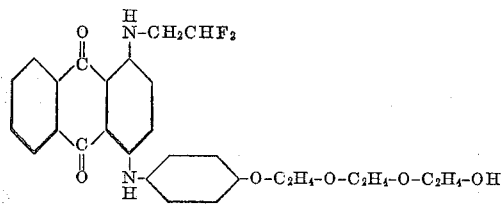

and colors cellulose acetate blue shades.

EXAMPLE 3

38.4 grams of 1-$\beta,\beta,\beta$-trifluoroethylamino-4-bromoanthraquinone and 30.6 grams of o-aminophenyl-$\beta$-hydroxy-$\beta$-ethoxy-$\beta$-ethoxyethyl ether are added to 200 cc. of n-amyl alcohol containing 12 grams of potassium acetate and 1.2 grams of finely powdered cupric sulfate. The resulting mixture is stirred while heating under reflux for about seven hours or until no further color change can be detected. The reaction product is isolated and purified by following the procedure described under Example 1 entitled Method I. The dye compound obtained in this manner has the formula:

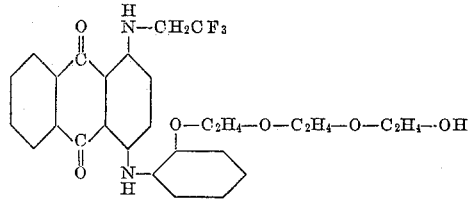

and colors cellulose acetate blue shades.

EXAMPLE 4

38.4 grams of 1-$\beta,\beta,\beta$-trifluoroethylamino-4-bromoanthraquinone, 30.6 grams of p-aminophenyl-$\beta$-hydroxy-$\beta$-ethoxy-$\beta$-ethoxyethyl ether, 12 grams of potassium acetate, and 1.2 grams of finely powdered cupric sulfate are heated under reflux with stirring in 200 cc. of n-amyl alcohol. Heating is continued for seven hours or until no further color change can be detected. The reaction product is isolated and purified by following the procedure described under Example 1 entitled Method I. The dye compound thus obtained has the formula:

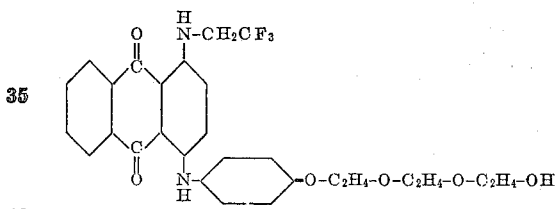

and colors cellulose acetate blue shades.

EXAMPLE 5

36.6 grams of 1-$\beta,\beta$-difluoroethylamino-4-bromoanthraquinone, 25 grams of p-aminophenyl-$\beta$-hydroxy-$\beta$-ethoxyethyl ether, 12 grams of potassium acetate, and 1.2 grams of finely powdered cupric sulfate are added to 200 cc. of n-amyl alcohol. The mixture formed is stirred and heated under reflux for about seven hours or until no further color change occurs. The reaction product is isolated and purified by Method I under Example 1. The 1-$\beta,\beta$-difluoroethylamino-4-(p - $\beta$ - hydroxy - $\beta$ - ethoxyethoxyphenyl) aminoanthraquinone thus obtained in good yield has the formula:

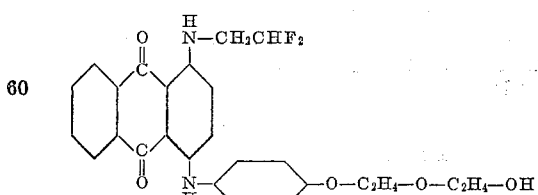

and colors cellulose acetate blue shades.

EXAMPLE 6

38.4 grams of 1-$\beta,\beta,\beta$-trifluoroethylamino-4-bromoanthraquinone, 32.4 grams of p-aminophenyl - $\beta$ - methoxy - $\beta$ - ethoxy-$\beta$-ethoxyethyl ether, 12 grams of potassium acetate, and 1.2 grams of finely powdered cupric sulfate are added to 200 cc. of n-amyl alcohol and the resulting mixture is heated under reflux, with stirring, for about seven hours. The dye product formed is recovered and purified by following the procedure described in Method I under Example 1. The dye compound obtained has the formula:

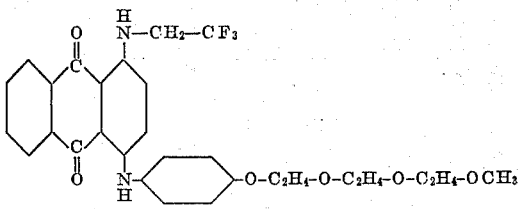

and colors cellulose acetate blue shades.

EXAMPLE 7

38.4 grams of 1-$\beta,\beta,\beta$-trifluoroethylamino-4-bromoanthraquinone and 28.5 grams of o-aminophenyl-$\beta$-ethoxy-$\beta$-ethoxyethyl ether are added to 200 cc. of n-amyl alcohol containing 12 grams of potassium acetate and 1.2 grams of finely powdered cupric sulfate. The resulting mixture is heated under reflux with stirring for about seven hours. The dye product formed is recovered and purified by following the procedure described under Example 1 entitled Method I. The dye compound obtained in this manner has the formula:

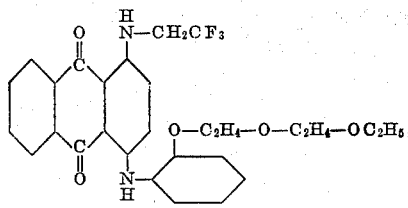

and colors cellulose acetate blue shades.

EXAMPLE 8

38.4 grams of 1-$\beta,\beta,\beta$-trifluoroethylamino-4-bromoanthraquinone and 25 grams of p-aminophenyl-$\beta$-hydroxy-$\beta$-ethoxyethyl ether are added to 200 cc. of n-amyl alcohol containing 12 grams of potassium acetate and 1.2 grams of finely powdered cupric sulfate. The resulting mixture is stirred while heating under reflux for about seven hours following which the dye product is recovered by employing the procedure described under Example 1 entitled Method I. The dye compound obtained in this manner has the formula:

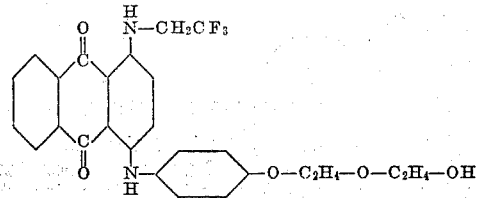

and colors cellulose acetate blue shades.

EXAMPLE 9

38.4 grams of 1-$\beta,\beta,\beta$-trifluoroethylamino-4-bromoanthraquinone, 26.8 grams of p-aminophenyl-$\beta$-methoxy-$\beta$-ethoxyethyl ether, 12 grams of potassium acetate, and 1.2 grams of finely powdered cupric sulfate are added to 200 cc. of n-amyl alcohol. The resulting mixture is stirred while heating under reflux for about seven hours or until no further color change is descernible in a series of acetone samples containing one drop of the reaction mixture removed periodically. The dye product is recovered and purified by following the procedure described under Example 1 entitled Method I. A good yield of 1-$\beta,\beta,\beta$-trifluoroethylamino - 4 - (p - $\beta$ - methoxy-$\beta$-ethoxyethoxyphenyl) aminoanthraquinone is thus obtained. The dye has the formula:

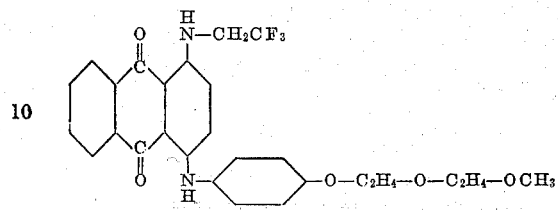

and colors cellulose acetate blue shades.

EXAMPLE 10

36.6 grams of 1-$\beta,\beta$-difluoroethylamino-4-bromoanthraquinone, 34.1 grams of p-aminophenyl-$\beta$-ethoxy-$\beta$-ethoxy-$\beta$-ethoxyethyl ether, 12 grams of potassium acetate, and 1.2 grams of finely powdered cupric sulfate are added to 200 cc. of n-amyl alcohol. The resulting mixture is heated under reflux with stirring for about seven hours or until no further color change can be detected. The dye product is recovered and purified by following the procedure under Example 1 entitled Method I. The 1-$\beta,\beta$-difluoroethylamino-4-(p-$\beta$-ethoxy-$\beta$-ethoxy-$\beta$ - ethoxyethoxyphenyl) aminoanthraquinone thus obtained has the formula:

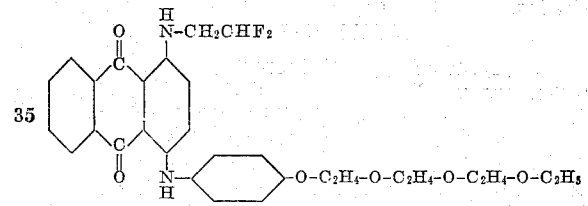

and colors cellulose acetate blue shades.

EXAMPLE 11

36.6 grams of 1-$\beta,\beta$-difluoroethylamino-4-bromoanthraquinone and 25 grams of o-aminophenyl-$\beta$-hydroxy-$\beta$-exthoxyethyl ether are added to 200 cc. of n-amyl alcohol containing 12 grams of potassium acetate and 1.2 grams of finely powdered cupric acetate. The resulting mixture is stirred while heating under reflux for about seven hours or until no further change in color can be detected. The dye product formed is recovered and purified according to the procedure described under Example 1 entitled Method I. The 1-$\beta,\beta$-di-fluoroethylamino-4-(o-$\beta$-hydroxy - $\beta$ - ethoxyethoxyphenyl) aminoanthraquinone thus obtained has the formula:

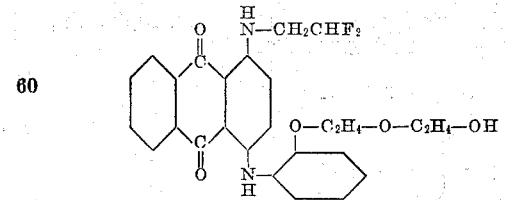

and colors cellulose acetate blue shades.

EXAMPLE 12

36.6 grams of 1-$\beta,\beta$-difluoroethylamino-4-bromoanthraquinone, 30.6 grams of m-aminophenyl-$\beta$-hydroxy-$\beta$-ethoxy-$\beta$-ethoxyethyl ether, 12 grams of potassium acetate and 1.2 grams of finely powdered cupric sulfate are heated under reflux with stirring in 200 cc. of n-amyl alcohol. Heating is continued for seven hours and then the reaction product is isolated and purified by Method I under Example 1. The dye compound thus obtained has the formula:

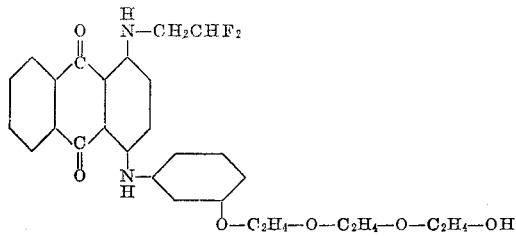

It colors cellulose acetate blue shades.

By the substitution of 25 grams of m-aminophenyl-β-hydroxy-β-ethoxyethyl ether for the ether compound of the foregoing example, the dye compound having the formula:

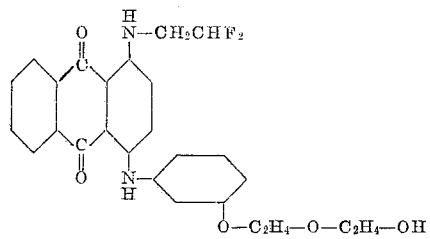

is obtained. It colors cellulose acetate blue shades.

EXAMPLE 13

36.6 grams of 1-β,β-difluoroethylamino-4-bromoanthraquinone, 32.4 grams of m-aminophenyl-β-methoxy-β-ethoxy-β-ethoxyethyl ether, 12 grams of potassium acetate and 1.2 grams of finely powdered cupric sulfate are added to 200 cc. of n-amyl alcohol and the resulting mixture is heated under reflux with stirring for about seven hours. The dye product formed is recovered and purified by following the procedure described in Method I under Example 1. The dye compound obtained has the formula:

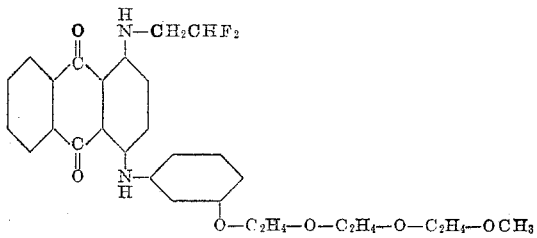

It colors cellulose acetate blue shades.

By the substitution of 28.5 grams of m-aminophenyl-β-ethoxy-β-ethoxyethyl ether for the ether compound of the foregoing example, the dye compound having the formula:

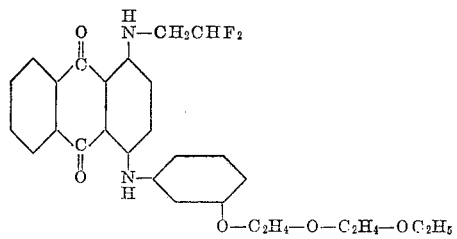

is obtained. It colors cellulose acetate blue shades.

EXAMPLE 14

38.4 grams of 1-β,β,β-trifluoroethylamino-4-bromoanthraquinone, 30.6 grams of m-aminophenyl-β-hydroxy-β-ethoxy-β-ethoxyethyl ether, 12 grams of potassium acetate and 1.2 grams of finely powdered cupric sulfate are heated under reflux with stirring in 200 cc. of n-amylalcohol for about 7 hours. The reaction product is isolated and purified by following the procedure described under Example 1 entitled "Method I." The dye compound thus obtained has the formula:

and colors cellulose acetate blue shades.

By the substitution of 25 grams of m-aminophenyl-β-hydroxy-β-ethoxyethyl ether for the ether compound of the foregoing example, the dye compound having the formula:

is obtained. It colors cellulose acetate blue shades.

EXAMPLE 15

38.4 grams of 1-β,β,β-trifluoroethylamino-4-bromoanthraquinone, 34.1 grams of m-aminophenyl-β-ethoxy-β-ethoxy-β-ethoxyethyl ether, 12 grams of potassium acetate and 1.2 grams of finely powdered cupric sulfate are added to 200 cc. of n-amyl alcohol and the resulting mixture is heated under reflux with stirring for about seven hours. The dye product formed is isolated and purified by following the procedure described in Method I under Example 1. The dye compound obtained has the formula:

and colors cellulose acetate blue shades.

By the substitution of 26.8 grams of m-aminophenyl-β-methoxy-β-ethoxyethyl ether for the ether compound of the foregoing example, the dye compound having the formula:

is obtained. It colors cellulose acetate blue shades.

While the recovery of the compounds of my invention has been described primarily in connection with Method I of Example 1 it will be understood that Method II of Example 1 can also be used. Similarly, while the compounds of my invention have been described primarily with reference to their application to cellulose acetate textile materials it is to be clearly understood that they can be used for the coloration of the other textile materials indicated herein.

In order that my invention may be entirely clear the preparation of certain of the starting materials needed to prepare the new compounds is given hereinafter.

*1-β,β,β-trifluoroethylamino-4-bromoanthroquinone*

61 grams of 1-β,β,β-trifluoroethylaminoanthraquinone are dissolved in 590 grams of pyridine and heated on a water bath to 60° C. while stirring. Then while maintaining this temperature, 33.2 grams of bromine are added to the reaction mixture over a 1½-hour period. The reaction mixture is then slowly heated to 90°–95° C., maintained at this temperature for two hours, and the 1-β,β,β-trifluoroethylamino-4-bromoanthraquinone which is formed is recovered by filtration, washed with 100 grams of pyridine, and dried.

1-β,β-difluoroethylamino-4-bromoanthraquinone is prepared by substituting 57.4 grams of 1-β,β-difluoroethylaminoanthraquinone for the 61 grams of 1-β,β,β-trifluoroethylaminoanthraquinone in the above example and carrying out the procedure exactly as described.

*1-β,β,β-trifluoroethylaminoanthraquinone*

10 grams of 1-nitroanthraquinone in 100 grams of dry pyridine are heated to 100° C. and 5 grams of β,β,β-trifluoroethylamine are added dropwise. A reddish color indicating reaction develops at once and after a short period of heating, preferably with stirring, the reaction is complete. 1-β,β,β-trifluoroethylaminoanthraquinone crystallizes out of the pyridine on cooling and is recovered by filtration. It can be further purified by recrystallization from a solvent such as pyridine, toluene or acetic acid.

1-β,β-difluoroethylaminoanthraquinone is prepared by substituting 4 grams of β,β-difluoroethylamine for the 5 grams of β,β,β-trifluoroethylamine in the above example and carrying out the procedure exactly as described.

The preparation of 1-β,β,β-trifluoroethylaminoanthraquinone and of 1-β,β,β-trifluoroethylamino-4-bromoanthraquinone is also described in my copending U. S. patent application Serial No. 657,345, filed March 26, 1946, now Patent 2,466,008. The preparation of 1-β,β-difluoroethylaminoanthraquinone and of 1-β,β-difluoroethylamine-4-bromoanthraquinone is also described in my copending application Serial No. 658,217, filed March 29, 1946, now Patent 2,466,009.

Compounds having the formula:

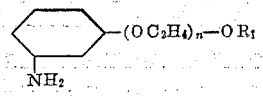

are obtained by reduction of the corresponding nitro compound. This reduction can conveniently be carried out at a temperature of 75° C.–100° C. with hydrogen under pressure in the presence of Raney nickel as a catalyst and in the presence of an inert solvent or diluent such as ethyl alcohol.

Compounds having the formula:

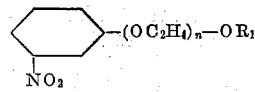

are obtained by reacting a compound having the formula:

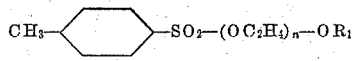

with m-nitrophenol in its sodium or potassium salt form. These latter compounds are in turn obtained by reacting a compound having the formula:

$$H—(OC_2H_4)_n—OR_1$$

with p-toluenesulfonyl chloride. The members $n$ and $R_1$ as used here and throughout the specification have the meaning previously assigned to them. The series of reactions just referred to will be illustrated with reference to m-aminophenyl-β-hydroxy-β-ethoxy-β-ethoxyethyl ether.

*m-Nitrophenyl-β-hydroxy-β-ethoxy-β-ethoxyethyl ether*

107 grams of triethylene glycol-p-toluene sulfonate,

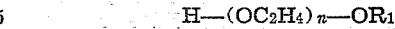

49 grams of m-nitrophenol, 14 grams of NaOH and 127 cc. of water were heated to boiling for 6 hours. Then 200 cc. of water were added and the insoluble liquid which formed was separated in a separatory funnel and washed twice with H₂O. Upon crystallization from ethyl alcohol 33 grams of crystals melting at 83° C.–85° C. were obtained.

*m-Aminophenyl-β-hydroxy-β-ethoxy-β-ethoxyethyl ether*

33 grams of m-nitrophenyl-β-hydroxy-β-ethoxy-β-ethoxyethyl ether obtained as described above were dissolved in 50 cc. of ethyl alcohol and placed in a shaking autoclave. The compound was then reduced under 1500 lbs. hydrogen pressure at 75° C.–100° C. for 3–4 hours. The reaction mixture was then cooled, filtered, and the filtrate distilled under reduced pressure to recover the m-aminophenyl-β-hydroxy-β-ethoxy-β-ethoxyethyl ether which boils at 195° C.–205° C./2½ mm.

*p-Triethyleneglycol-p-toluene sulfonate*

236 grams of triethylene glycol and 75 grams of p-toluene sulfonyl chloride were placed in a 2 liter 3-necked flask equipped with a stirrer, thermometer and dropping funnel. Then 157 cc. of 5 N NaOH were added dropwise, with stirring, at such a rate that the temperature (external cooling was employed) remained below 15° C. After the addition of the NaOH another 75 grams of p-toluene sulfonyl chloride were added to the reaction mixture and another 157 cc. of 5 N NaOH were added dropwise, with stirring, while maintaining the temperature below 15° C. The reaction mixture was then stirred for 4 hours more. The p-triethyleneglycol-p-toluene sulfonate formed separated slowly as a white plastic solid and was recovered by filtration and dried in a vacuum dessicator. The yield obtained was 45% of the theoretical.

The anthraquinone dye compounds of my invention are applied to the coloration of the hereinbefore mentioned textile materials by direct dyeing procedures well-known in the art. Ordinarily the dye is applied in the form of an aqueous dispersion in which the textile material undergoing coloration is immersed. A uniform dispersion of the finely powdered dye is obtained, for example, by initially grinding the dye with a suitable dispersing agent such as a sulfonated oil, soap, or oleyl glyceryl sulfate and then dispersing the resulting paste in water. The fabric is immersed in the dyebath which is initially at a temperature of 45–55° C., for example, and then the temperature is raised to that selected for carrying out the dyeing operation, advantageously in the range of 60–85° C. As is understood by those skilled in the art, the intensity of dyeing can be varied by varying the proportion of dye to material undergoing coloration. Generally speaking, 0.1 to 2% by weight of dye to material is employed although any desired proportions can be used.

I claim:

1. The anthraquinone compounds having the formula:

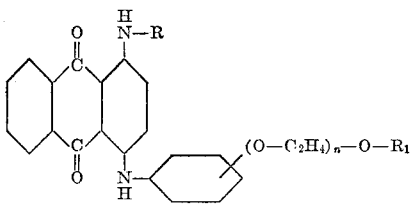

wherein R represents a member selected from the group consisting of a β,β-difluoroethyl group and a β,β,β-trifluoroethyl group, $R_1$ represents a member selected from the group consisting of a hydrogen atom and an alkyl hydrocarbon group having from one to two, inclusive, carbon atoms, and $n$ represents a small whole integer of from two to three, inclusive.

2. The anthraquinone compounds having the formula:

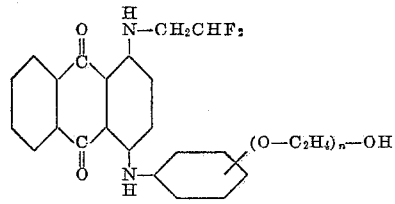

wherein $n$ represents a whole integer of from two to three, inclusive.

3. The anthraquinone compounds having the formula:

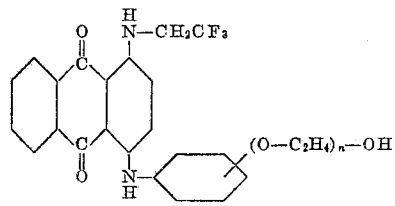

wherein $n$ represents a whole integer of from two to three, inclusive.

4. The anthraquinone compounds having the formula:

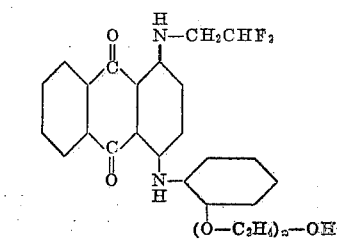

wherein $n$ represents a whole integer of from two to three, inclusive.

5. The anthraquinone compounds having the formula:

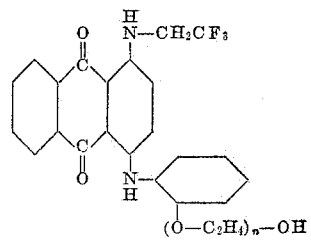

wherein $n$ represents a whole integer of from two to three, inclusive.

6. The anthraquinone compound having the formula:

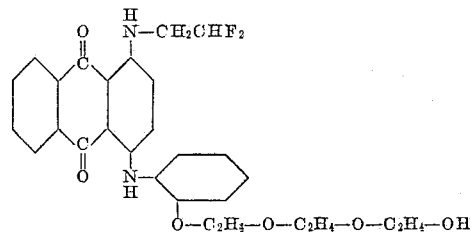

7. The anthraquinone compound having the formula:

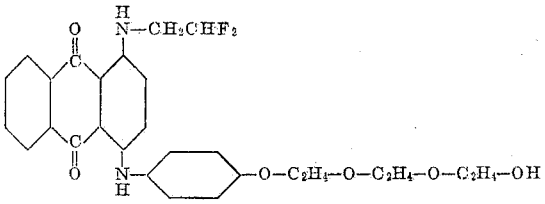

8. The anthraquinone compound having the formula:

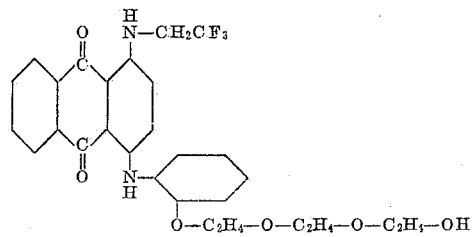

JOSEPH B. DICKEY.

REFERENCES CITED

The following references are of record in the file of this patent:

UNITED STATES PATENTS

| Number | Name | Date |
|---|---|---|
| 2,085,736 | Calcott et al. | July 6, 1937 |
| 2,174,182 | Schlichenmaier et al. | Sept. 26, 1939 |
| 2,326,047 | McNally et al. | Aug. 4, 1943 |
| 2,333,402 | Wuertz et al. | Nov. 2, 1943 |
| 2,357,176 | Dickey | Aug. 29, 1944 |
| 2,391,011 | Dickey et al. | Dec. 18, 1945 |

OTHER REFERENCES

Gilman, ed., "Organic Chemistry" (2nd ed. 1943), vol. I, pp. 956, 960, 963.